March 17, 1970 J. P. DRY 3,500,739
PLASTIC REGISTER WITH SHUTTER BLADES
Filed May 23, 1968 2 Sheets-Sheet 1
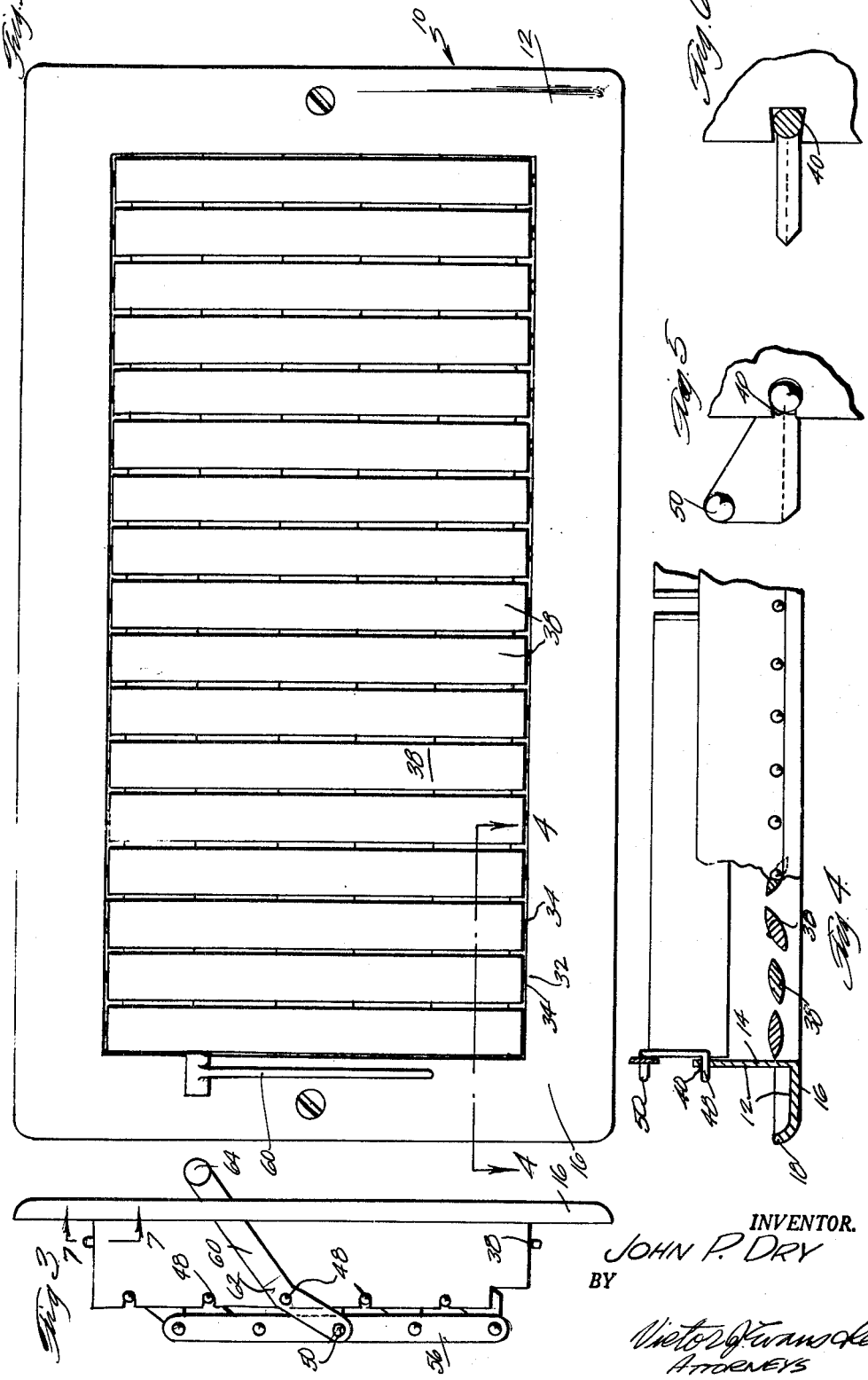
INVENTOR.
JOHN P. DRY
BY
Victor J. Evans & Co.
ATTORNEYS

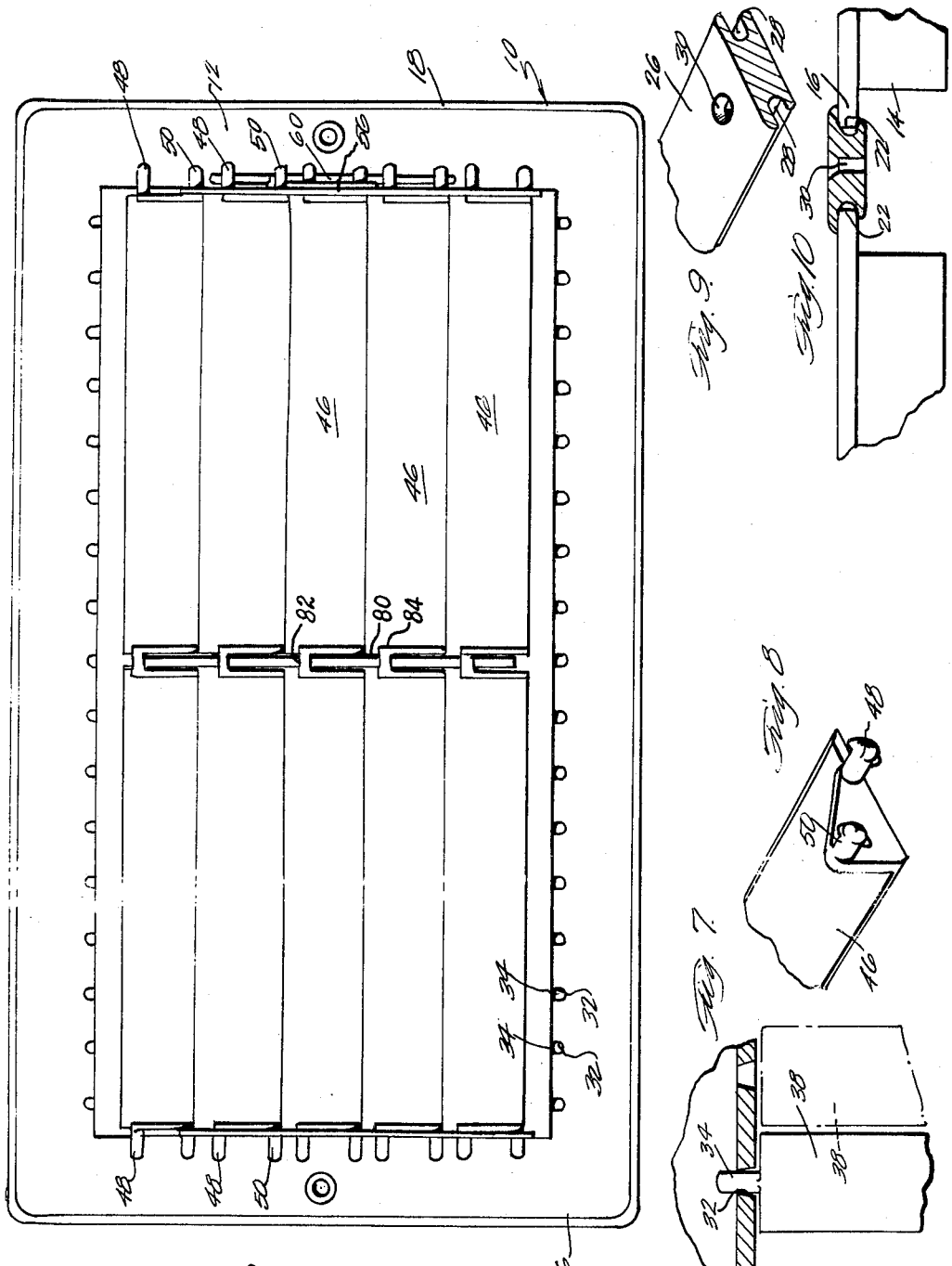

United States Patent Office 3,500,739
Patented Mar. 17, 1970

3,500,739
PLASTIC REGISTER WITH SHUTTER BLADES
John P. Dry, 607 N. Rogers, Winter, Tex. 79567
Filed May 23, 1968, Ser. No. 731,371
Int. Cl. F24f 13/14
U.S. Cl. 98—110
2 Claims

ABSTRACT OF THE DISCLOSURE

A pastic grille or register having a plastic L-shaped frame about and forming an opening, U-shaped slots forming a series along the edge of the sides of the frame and equally spaced from each other, and arranged in mating symmetry, a shutter blade extending side to side of the frame and closing off said space when in a common plane to each other, and providing an opening through said space when perpendicularly arranged with the plane of said space, said shutter blades having pin extensions for mating with the U-shaped slots, extensions from the free ends of the shutter blades, a lever engaging each of the extensions to provide unison of action, an actuator arm mounted from its intermediate portion on one of the pin extensions and engaging at a fixed end thereof, the free end extension of one of the extensions for opening and closing said grille.

---

The present invention relates to an injection molded plastic grille or register for use in heating and cooling, as well as in the ventilating industry, and in which the parts are formed from molded components and are assembled together without the extended use of other items.

An object of this invention is to provide an adjustable bar grille or register with or without a multi-shutter damper. In the heating, cooling and ventilating industry, a grille is commonly referred to as an air outlet without a damper. A register is commonly referred to as an air outlet with a multi-shutter damper.

An object of this invention is to provide a one-piece frame that, when formed by injection molding in a die, all welding or joining by other similar methods of fastening are eliminated. Thus, each frame produced remains constant in size. This is not always true in frames constructed in the conventional manner.

A further object of the invention is to provide that parts, to be added to or connected to the frame to complete the grille or register, be formed by injection molding in a die insuring that all parts will be a perfect fit to the injection molded frame.

A further object of this invention is to provide a grille or register of a material that is lightweight, flexible, completely rust- and corrosion-proof, and with a permanent textured finish; to provide a reduction in noise level caused by large volume, high velocity air movement through the grille or register. These provisions are not found in conventional grilles and registers.

A further outstanding objective is to provide a grille or register of a material that is highly resistant to flexural stress, superior strength, and impact resistance. Conventionally constructed grilles and registers fabricated of steel and aluminum are subject to damage in handling and installation to the point that such damage results in replacement. In the case of the plastic grille or register, damage is eliminated due to handling, dropping, unusual shocks or contact with other objects.

A further object of the invention is to provide a mullion which is fitted over a squared end of one of adjacent ends to another similar frame, so that, when the grilles are joined, flanges on the ends of each grille are cut off and will therefore provide the normal measurement of twice the measurement of a single plastic grille or register. Therefore, the overall measurement will not be increased by the length of the flanges, but merely by twice the size of the frame for two, and other multiples for additional units by the same fixed ratio.

The above and other objects and advantages of the invention will become apparent upon full consideration of the following detailed description and accompanying drawings in which:

FIGURE 1 is a front elevation view of the plastic grille according to the preferred embodiment of the invention;

FIGURE 2 is a rear view thereof;

FIGURE 3 is a side view thereof;

FIGURE 4 is a cross-sectional view taken along line 4—4 of FIGURE 1;

FIGURES 5 and 6 are enlarged detail views showing U-shaped slots in the side elements of the frame forming the grille of FIGURE 1;

FIGURE 7 is a cross-sectional view taken along line 7—7 of FIGURE 3, and on an enlarged scale relative thereto;

FIGURE 8 is an enlarged perspective view showing the details of the pivotal and extension free pins of the shutter blade according to the preferred concepts of the present invention; and FIGURES 9 and 10 show the perspective and cross-sectional views, respectively, of the mullion which forms and engages the squared off end flanges of the installation of a pair of two grilles or registers to provide a long installation.

Referring now to the drawings, there is shown a plastic grille or register 10 having an angled shaped open frame 12 of generally L-shape cross-section, comprising components 14, 16 as is shown, for example, in FIGURE 4, and as is shown in other figures. The open frame 12 has a beveled edge 18, but where the units 12 are desired to be placed along other similar units in longitudinal fashion, such as illustrated in FIGURE 10, then the beveled edge is squared off to form a squared end 22, 22, on which there is provided for inter-fitted a mullion 26. The mullion 26 is formed of plastic and has an engaging recess 28, 28, respectively, along the lateral edges of the mullion 26. Also provided within the structure of the mullion 26 is a supporting member receiving hole 30 for receiving a screw, rivet or other supporting means.

Along the upper and lower edges of the frame towards the front opening thereof, there is found provided a series of generally equally spaced mating holes 32, 32, for receiving ends or extensions 34, 34, as particularly shown in FIGURE 7, for receiving the pins in pivotal relation to the frame. The pins are disposed on the front opening of the frame 12 and are shown as elements or pin members 38.

On the rear opening portion of the frame, there are provided along the vertical sides U-shaped slots 40, 40, as shown in FIGURES 5 or 6, as well as FIGURE 4, so that there is provided support means for a shutter blade 46, 46 which extends from side to side of the frame, and forming a series array from top to bottom to close the space when parallel to the plane of the opening of the said frame. The shutter blades 46 also provide passage of air through the space when the shutter blades are perpendicular to the plane of the opening, and on the ends of each of the shutter blades there are pin extensions 48, 48 which are affixed to the shutter blade and which provide pivotal operation thereof. The pivoting is provided when the pin extensions 48 engage the U-shaped slots 40, and on the adjacent or opposite edges of the shutter blades 46, there are extensions 50, which extend from the free ends of the shutter blades. This is shown in detail in FIGURE 5.

As shown in FIG. 2 center support bar 80 is molded along with grille 10. Shutter blades 46 rest in and pivot within slots 82 of center support bar 80 by means of attachments 84 joining shutter blades 46 on both sides of center support bar 80.

Coupling in series array is a lever or lever arm, shown particularly in FIGURES 2 and 3, which provides a lever for engaging the extension 50, 50, forming a series. In this manner, the shutter blades 46 operate as a system or series arrangement.

An actuator arm 60, shown in FIGURES 1, 2 and 3, is mounted from an intermediate portion 62 thereof, on an extension 50, as is selected, and in which a handle 64 is provided on one end. On the other end, there is an aperture for receiving an extension that is also engaging with the lever 56, so that the extension 50 is actuated upon movement of the actuator arm 60.

The molded apparatus and construction of the plastic grille or register of the present invention is seen to provide a ready and quickly assembled structure that is adequate and complete in its function and operation, and obtains the objects and advantages of the present invention.

Additional embodiments of the invention in this specification will occur to others and, therefore, it is intended that the scope of the invention be limited by the appended claims and not by the embodiment described hereinabove. Accordingly, reference should be made to the following claims in determining the full scope of the invention.

What is claimed is:

1. A molded plastic device for controlling ventilation comprising:

an angle shaped open frame with an L-shaped cross-section having a series of spaced mating holes in the upper and lower ends of said frame and a series of U-shaped slots spaced along an edge of the sides of said frame, said holes bored out with a conical taper, the diameter of said holes at the outside surface of said frame being slightly smaller than the diameter of said holes at the inside surface of said frame, and said slots tapering to a greater diameter as they extend from the inside surface of said frame out towards the outside surface of said frame; and a series of vertical front blades having pins formed on their ends for pivotal insertion through said holes, the diameter of the pins being of a dimension lying between the outside and inside frame surface diameters of said holes for frictionally holding said vertical blades in place, for allowing said vertical blades to be turned easily by hand, and for frictionally holding said vertical blades at a desired angle.

2. A molded plastic device for controlling ventilation as recited in claim 1, including:

rows of shutter blades having extensions formed on their ends located near the sides of said frame, the extensions having pins for pivotal insertion through said slots, said shutter blades closing the opening of said frame when pivoted parallel thereto and providing passage of air through the opening of said frame when perpendicular thereto;

a lever engaging each of the extensions of said shutter blades; and an actuator arm pivotally mounted on one of the sides of said frame and pivotally connected to one of the extensions of said shutter blades, the diameter of the pins of the extensions of said shutter blades being of a dimension lying between the diameters of the open and far ends of said slots for allowing said shutter blades to be snapped into place and held in position solely by means of said slots, for allowing said shutter blades to turn as said actuator arm pivots about the side of said frame, and for frictionally holding said shutter blades at a desired angle.

References Cited
UNITED STATES PATENTS

| | | | |
|---|---|---|---|
| 1,403,054 | 1/1922 | Nabers | 98—110 |
| 2,569,689 | 10/1951 | Porter | 98—121 |
| 3,388,655 | 6/1968 | Dennis | 98—121 XR |

MEYER PERLIN, Primary Examiner

U.S. Cl. X.R.

98—121